(12) United States Patent
Um et al.

(10) Patent No.: US 10,354,456 B2
(45) Date of Patent: Jul. 16, 2019

(54) APPARATUS AND METHOD FOR DETERMINING TOLL GATE SECTION

(71) Applicant: Hyundai Motor Company, Seoul (KR)

(72) Inventors: Doo Jin Um, Seoul (KR); Kyoung Jun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/496,454

(22) Filed: Apr. 25, 2017

(65) Prior Publication Data

US 2018/0174371 A1 Jun. 21, 2018

(30) Foreign Application Priority Data

Dec. 15, 2016 (KR) ........................ 10-2016-0171747

(51) Int. Cl.
| | |
|---|---|
| G07B 15/06 | (2011.01) |
| G08G 1/0962 | (2006.01) |
| G06K 9/00 | (2006.01) |
| G01C 21/36 | (2006.01) |

(52) U.S. Cl.
CPC ......... *G07B 15/06* (2013.01); *G01C 21/3658* (2013.01); *G06K 9/00798* (2013.01); *G08G 1/09626* (2013.01)

(58) Field of Classification Search
CPC .................................. G07B 15/06; G08G 1/04
USPC ........................................................ 340/928
See application file for complete search history.

(56) References Cited

U.S. PATENT DOCUMENTS

| | | | |
|---|---|---|---|
| 7,432,848 B2* | 10/2008 | Munakata | G01S 13/931 342/118 |
| 2003/0139882 A1 | 7/2003 | Miller et al. | |
| 2006/0149467 A1* | 7/2006 | Nakayama | G01C 21/367 701/431 |
| 2008/0040022 A1* | 2/2008 | Tanaka | G01C 21/3694 701/117 |
| 2012/0232733 A1 | 9/2012 | Herbin et al. | |
| 2014/0244131 A1* | 8/2014 | Mielich | B60W 30/12 701/99 |
| 2015/0220795 A1 | 8/2015 | Fischer et al. | |
| 2017/0232967 A1* | 8/2017 | Tomatsu | B60W 30/18009 701/117 |
| 2018/0099676 A1* | 4/2018 | Goto | B60W 30/10 |

FOREIGN PATENT DOCUMENTS

| | | |
|---|---|---|
| EP | 2 152 558 B1 | 8/2011 |
| JP | 2015-4543 A | 1/2015 |
| KR | 10-1248868 B1 | 4/2013 |

(Continued)

*Primary Examiner* — Steven Lim
*Assistant Examiner* — Mancil Littlejohn, Jr.
(74) *Attorney, Agent, or Firm* — Morgan, Lewis & Bockius LLP (57) ABSTRACT

A toll gate section determining apparatus may include an information providing device that provides information by use of a camera, a radar, and a navigation device; a toll gate section determining device that determines a toll gate section based on movement information and line information of a neighboring vehicle, which are provided from the camera and the radar, and map information provided from the navigation device; and a vehicle control device that controls longitudinal driving or transverse driving of a vehicle when a current section is determined as the toll gate section.

16 Claims, 8 Drawing Sheets

(56) References Cited

FOREIGN PATENT DOCUMENTS

| | | |
|---|---|---|
| KR | 10-2014-0084962 A | 7/2014 |
| KR | 10-2016-0053385 A | 5/2016 |
| WO | WO 2008/142343 A2 | 11/2008 |
| WO | WO-2016159170 A1 * | 10/2016 ............ B60W 30/10 |

* cited by examiner

APPARATUS AND METHOD FOR DETERMINING TOLL GATE SECTION

CROSS-REFERENCE(S) TO RELATED APPLICATIONS

The present application claims priority to Korean Patent Application No. 10-2016-0171747, filed on Dec. 15, 2016, the entire contents of which is incorporated herein for all purposes by this reference.

BACKGROUND OF THE INVENTION

Field of the Invention

The present invention relates to a toll gate section determining apparatus and a toll gate section determining method, and more particularly, to a technology which determines an open-type toll gate section based on the information that a vehicle provides.

Description of Related Art

The congestion or delay caused by an accident or a broken vehicle disturbs the smooth flow of traffic on a road. However, even when there is no congestion due to an accident or a broken vehicle, the flow of vehicles temporarily slows in the vicinity of a toll gate of a highway or toll road in which a toll is charged. The reason is that the remaining vehicles need to wait while a plurality of vehicles pass through a limited number of toll gates and the preceding vehicle pays the toll.

When the time stalled on a toll gate lengthens the risk of an accident increases due to the drivers of vehicles desire to pass ahead of each other are congested with one another. The vehicles are driven to one side because of excessive competition among vehicles or an inaccurate forecast and judgment. Accordingly, the time to pass through the toll gate may be delayed.

Meanwhile, technologies directed to providing a forward collision warning (FCW) function or a blind spot warning (BSW) function, which complements the blind spot of a driver, are widely applied to recently released vehicles having an inter-vehicle communication function. The effective use of the inter-vehicle communication function may lead to an even distribution of vehicles passing through the toll gate, thereby reducing the transit time through the toll gate while maintaining a smooth vehicle passage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

An aspect of Various aspects of the present invention are directed to providing a toll gate section determining apparatus configured to determine a toll gate section by use of map information of a vehicle, movement information of a neighboring vehicle, and information about the lane in which the vehicle is driving, and controls the longitudinal or transverse driving of the vehicle corresponding to a toll gate section, or notifies a driver that the vehicle is entering a toll gate section, and a toll gate section determining method.

Various aspects and advantages of the present invention will be understood from the following description, which will be apparently understood from an exemplary embodiment of the present invention. It will be easily understood that the aspects and advantages of the invention are realized by means and combinations described in the appended claims.

According to various aspects of the present invention, a toll gate section determining apparatus includes an information providing device configured to provide information by use of a camera, radar, and a navigation device; a toll gate section determining device configured to determine a toll gate section based on the movement information and line information of a neighboring vehicle, which are provided from the camera and radar, and map information provided from the navigation device; and a vehicle control device configured to control the longitudinal or transverse driving of a vehicle when a current section is determined as the toll gate section.

The information providing device may include a map information processing device configured to determine the road environment of a driving direction of an own vehicle based on the map information; a neighboring vehicle movement determining device configured to determine the movement of the detected neighboring vehicle; and a line information processing device configured to process the line information of the driven vehicle by use of the camera and radar.

The map information processing device may determine toll gate point information, the number of lines of the driving direction, a speed limit of a road, and a general road or a highway type.

The neighboring vehicle movement determining device may determine longitudinal and transverse speed, acceleration, relative speed and acceleration, and a relative location of the neighboring vehicle.

The line information processing device may process the line information of the vehicle which is currently driving, or location information of a road facility.

The map information may include toll gate point information, the point in which the number of lines of a driving direction increases or decreases, and the speed limit of a road.

The toll gate section determining device may determine the toll gate section by analyzing whether the neighboring vehicle shows an unstable transverse driving pattern (dispersion or concentration of the lines).

The toll gate section determining device may determine the toll gate section based on whether a lane width increases or decreases.

When the toll gate section determining device determines the current section as a toll gate section, the vehicle control device may decelerate the vehicle below a safety speed, selectively control only the lane keeping function, or provide notification whether the vehicle enters a toll gate section through displaying a cluster or activating an alarm sound.

According to another aspect of the present invention, a method for determining a toll gate section includes determining whether a toll gate is in front of an own vehicle by use of map information that a navigation device included in the vehicle provides; comparing the remaining distance from the location of the own vehicle to the toll gate with a distance to be determined (TBD) by use of the map information; determining the reliability of the information about both lines of a lane in which the vehicle is driving; when the reliability of the information about both lines is determined to be valid, further determining whether a lane width increases; when the lane width increases, comparing a measured lane width with a specified lane width; when the result of comparing the measured lane width with the specified lane width indicates that the measured lane width is greater than the specified lane width, comparing a decrement of the measured lane width with a decrement of the specified lane width; and when the decrement of the measured lane width is greater than the decrement of the specified lane width, determining a current point as a toll gate starting point.

Determining the reliability of the information concerning both lines of the lane may include, when the result of determining the reliability of the information about both lines indicates that the reliability of the information about both lines is not valid, predicting the movement of a neighboring vehicle by use of a camera and radar.

The predicting of the movement of the neighboring vehicle may include: comparing the number of neighboring vehicles, which have successive transverse speeds with the specified number of neighboring vehicles; predicting the number of lanes by use of transverse locations of the neighboring vehicles of a front and a side of the own vehicle; and comparing the predicted number of lanes with the number of lanes that the navigation device provides.

The method may further include, when the predicted number of lanes is greater than the number of lanes that the navigation device provides, determining a current point as the toll gate starting point.

According to another aspect of the present invention, a method for determining a toll gate section includes determining whether a toll gate is behind an own vehicle by use of map information that a navigation device included in a vehicle provides; comparing the distance measured after the own vehicle passes through a toll gate with a distance TBD by use of the map information; determining the reliability of the information about both lines of a lane in which the vehicle is driving; when the reliability of the information regarding the both lines is determined to be valid, further determining whether a lane width decreases; when the lane width decreases, comparing an increment of a measured lane width with an increment of a specified lane width; and when the increment of the measured lane width is smaller than the increment of the specified lane width, determining a current point as a toll gate end point.

Determining the reliability of the information of both lines of the lane may include, when the result of determining the reliability of the information about both lines indicates that the reliability of the information about both lines is not valid, predicting the movement of a neighboring vehicle by use of a camera and radar.

Predicting the movement of a neighboring vehicle may include comparing the number of neighboring vehicles which have successive transverse speeds with the specified number of neighboring vehicles; predicting the number of lanes by use of transverse locations of the neighboring vehicles to the front and side of the own vehicle; and comparing the predicted number of lanes with the number of lanes that the navigation device provides.

The method may further include, when the predicted number of lanes is the same as the number of lanes that the navigation device provides, the determining the current point as the toll gate end point.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention through the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other exemplary embodiments, which may be included within the spirit and scope of the invention as defined by the appended claims.

As used herein, the term "and/or" includes any and all combinations of one or more of the associated listed items. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the singular terms "a," "an" and "the" are intended to include the plural forms as well, unless the context clearly indicates otherwise.

Furthermore, it will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Below, various embodiments will be described in detail with reference to the appended drawings.

Figure 1:
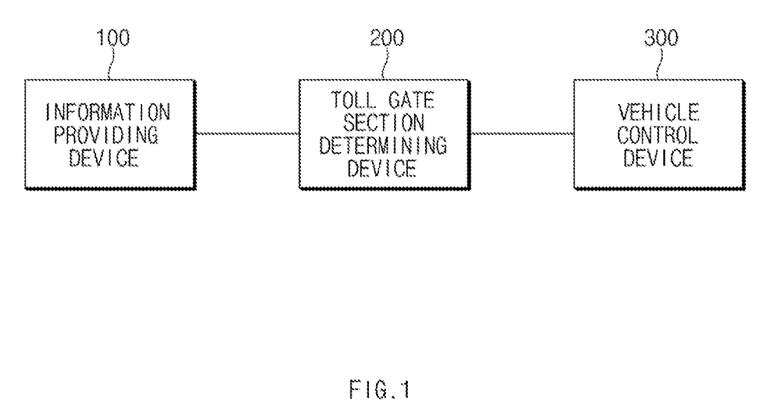
FIG. 1 is a block diagram for describing a toll gate section determining device, according to an exemplary embodiment of the present invention.

FIG. 1 is a block diagram for describing a toll gate section determining device, according to an exemplary embodiment of the present invention.

Referring to FIG. 1, a device that determines the toll gate section includes an information providing device 100, a toll gate section determining device 200, and a vehicle control device 300.

The information providing device 100 is configured to provide information by use of a camera, radar, and a navigation device.

That is, the information providing device 100 provides driving information of a neighboring vehicle, line information, and location information of a road facility. While a vehicle is driving, the information providing device 100 provides toll gate point information (open-type toll gate point information), the number of lanes or the number of line in the driving direction of the vehicle, or a speed limit of a road among pieces of information about a road.

The toll gate section determining device 200 is configured to determine a toll gate section based on information provided from a navigation device, which includes toll gate point information, a point in which the number of lines of a driving direction of the vehicle increases or decreases, and a speed limit of a road.

In addition, the toll gate section determining device 200 is configured to determine the toll gate section by analyzing the driving pattern (dispersion or concentration of the lines) in which the transverse driving of the neighboring vehicle is unstable.

Furthermore, the toll gate section determining device 200 may determine the toll gate section through a phenomenon in which a lane width increases.

When the toll gate section determining device 200 determines a current section as the toll gate section, the vehicle control device 300 controls the longitudinal transverse driving of the vehicle or provides notification that the vehicle is entering a toll gate section.

In other words, the vehicle control device 300 is configured to decelerate the vehicle below safety speed, selectively controls only a lane keeping function, or provides notification whether the vehicle enters the toll gate section by displaying a cluster or providing an alarm sound.

Figure 2:
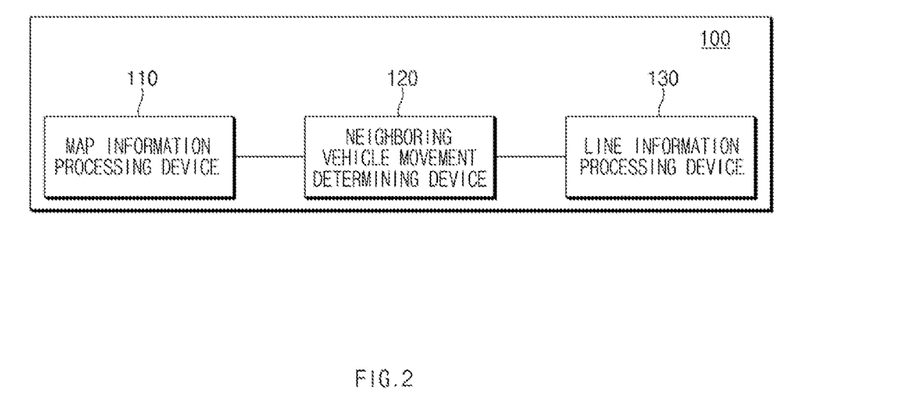
FIG. 2 is a block diagram for describing an information providing device of a toll gate section determining device, according to an exemplary embodiment of the present invention

FIG. 2 is a block diagram for describing an information providing device of the toll gate section determining device according to an exemplary embodiment of the present invention.

Referring to FIG. 2, the information providing device 100 provides information by use of a camera, radar, and a navigation device. The information providing device 100 includes a map information processing device 110, a neighboring vehicle movement determining device 120, and a line information processing device 130.

The map information processing device 110 includes the navigation device and is configured to determine the road environment of the driving direction of the own vehicle based on the map information of the navigation device.

That is, the map information processing device 110 provides toll gate point information, the number of lines of the driving direction, a speed limit of a road, and a road configuration (e.g., a general road or a highway) by use of the navigation device.

The neighboring vehicle movement determining device 120 is configured to determine the movement of a neighboring vehicle that the camera and the radar detect.

That is, the neighboring vehicle movement determining device 120 provides longitudinal speed, transverse speed, acceleration, relative speed, relative acceleration, or a relative location of the neighboring vehicle.

The line information processing device 130 is configured to process the line information of a vehicle which is driving by use of the camera and radar.

That is, the line information processing device 130 provides the line information of the vehicle which is currently driving, or location information of a road facility (e.g., a street lamp or a median strip).

In detail, the line information processing device 130 determines whether the lane in which the vehicle is driving is an edge line (e.g., a first line or a last line), and processes the information about the left and right lines, whether the information about left and right lines is valid, and a lane width.

Figure 3:
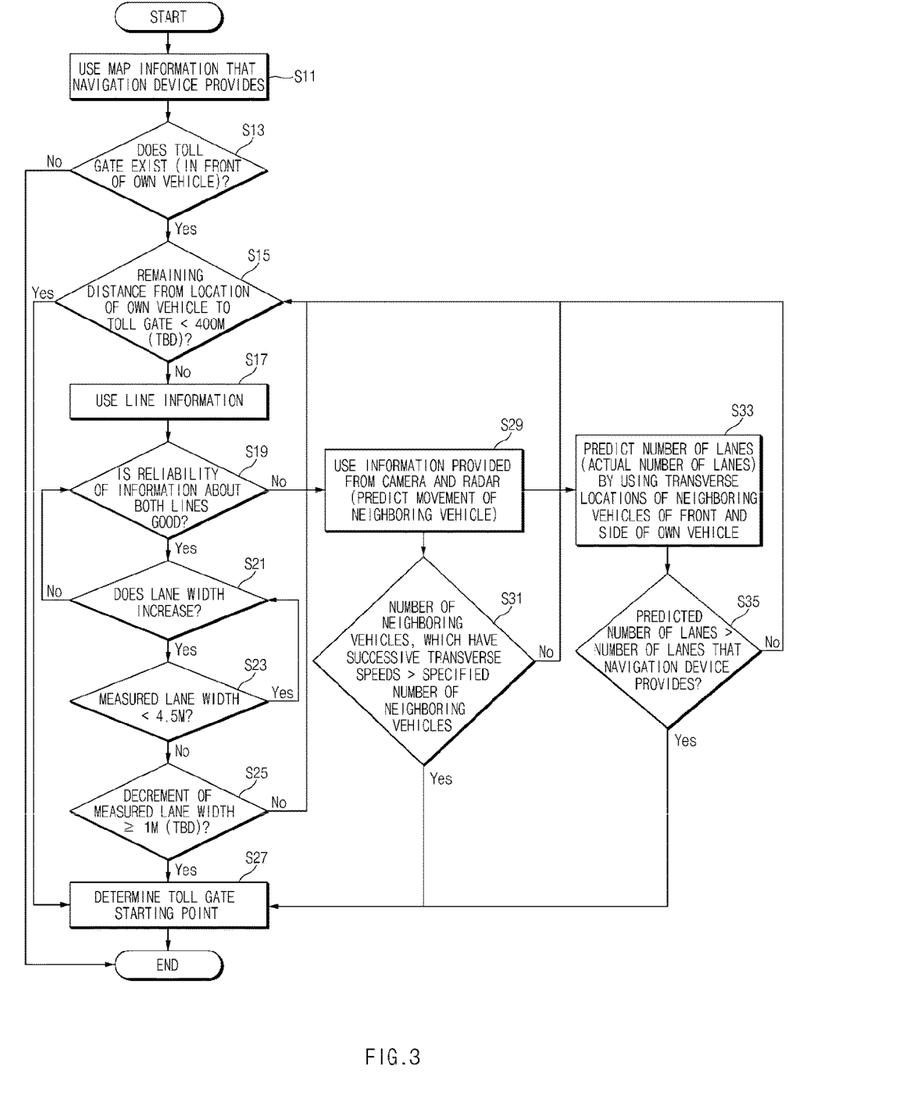
FIG. 3 is a flowchart for describing a method for determining a starting point of a toll gate section, according to an exemplary embodiment of the present invention.

FIG. 3 is a flowchart for describing a method for determining a starting point of a toll gate section, according to an exemplary embodiment of the present invention.

Referring to FIG. 3, a method for determining the starting point of a toll gate section by the toll gate section determining device of an apparatus that determines the toll gate section will be described in detail.

In operation S11, the device that determines the toll gate section uses the map information provided by the navigation device. That is, the map information that the navigation device provides includes toll gate point information, the number of lines in a driving direction, a speed limit of the road, and a road configuration (a general road or a highway).

In operation S13, the device that determines the toll gate section determines whether a toll gate is in front of an own vehicle by use of the map information that the navigation device.

In operation S15, the device that determines the toll gate section compares the remaining distance from a location of the own vehicle to the toll gate with a distance to be determined (TBD) by use of the map information that the navigation device provides.

For example, the distance TBD may be set to 400 m, and the distance TBD may be reset by the user or the device that determines the toll gate section.

In operation S17, when the remaining distance from a location of the own vehicle to the toll gate is greater than the distance to be determined (TBD), the device that determines the toll gate section uses the line information.

That is, the device that determines the toll gate section determines the toll gate section by use of the line information which the camera and radar provide, and location information of a vehicle that the navigation device provides.

In operation S19, the device that determines the toll gate section also determines the reliability of the information about both lines.

Herein, a method in which the device that determines the toll gate section determines the reliability of the information about both lines may determine the reliability of a left and right line with respect to the lane in which the vehicle is driving, by determining how much a line is recognized in the line information (a degree of recognition of the line).

In addition, when the fact that the toll gate is in front of the own vehicle indicates that the reliability of the line information is high, the starting point of the toll gate section has a pattern in which the lane width increases and then lane width decreases from a specific point in time.

In operation S21, when the reliability of the information about both lines is valid, the device that determines the toll gate section determines whether the lane width increases.

In operation S23, when the lane width increases the device that determines the toll gate section compares the measured lane width (the lane width measured by use of the camera and radar) with a specified lane width.

For example, the specified lane width may be set to 4.5 m, and the specified lane width may be reset by the user or the device that determines the toll gate section.

In operations S25 and S27, when the result of comparing the measured lane width with the specified lane width indicates that the measured lane width is greater than the specified lane width, the device that determines the toll gate section compares the decrement of the measured lane width with the decrement of the specified lane width.

For example, the decrement of the specified lane width may be set to 1 m, and the decrement of the measured lane width may be reset by the user or the device that determines the toll gate section.

In other words, when the decrement of the measured lane width is greater than the decrement of the specified lane width, the device that determines the toll gate section determines a current point as a toll gate starting point.

However, in operation S19, when the result of determining the reliability of the information about both lines indicates that the reliability is not valid, in operation S29, the device that determines the toll gate section predicts the movement of a neighboring vehicle by use of the camera and radar.

That is, the device that determines the toll gate section may determine the toll gate section by use of the movement information of a neighboring vehicle, which the camera and radar provide, and vehicle information that the navigation device provides.

In operation S31, the device that determines the toll gate section compares the number of neighboring vehicles which have successive transverse speeds with the specified number of neighboring vehicles.

In other words, when the number of neighboring vehicles which have successive transverse speeds is greater than the specified number of neighboring vehicles, the device that determines the toll gate section determines the current point as the toll gate starting point.

Furthermore, in operation S33, the device that determines the toll gate section predicts the number of lanes (the actual number of lanes) by use of transverse locations of the neighboring vehicles of the front and the side of the own vehicle.

In operation S35, the device that determines the toll gate section compares the predicted number of lanes with the number of lanes that the navigation device provides.

In other words, when the predicted number of lanes is greater than the number of lanes that the navigation device provides, the device that determines the toll gate section determines the current point as the toll gate starting point.

Figure 4:
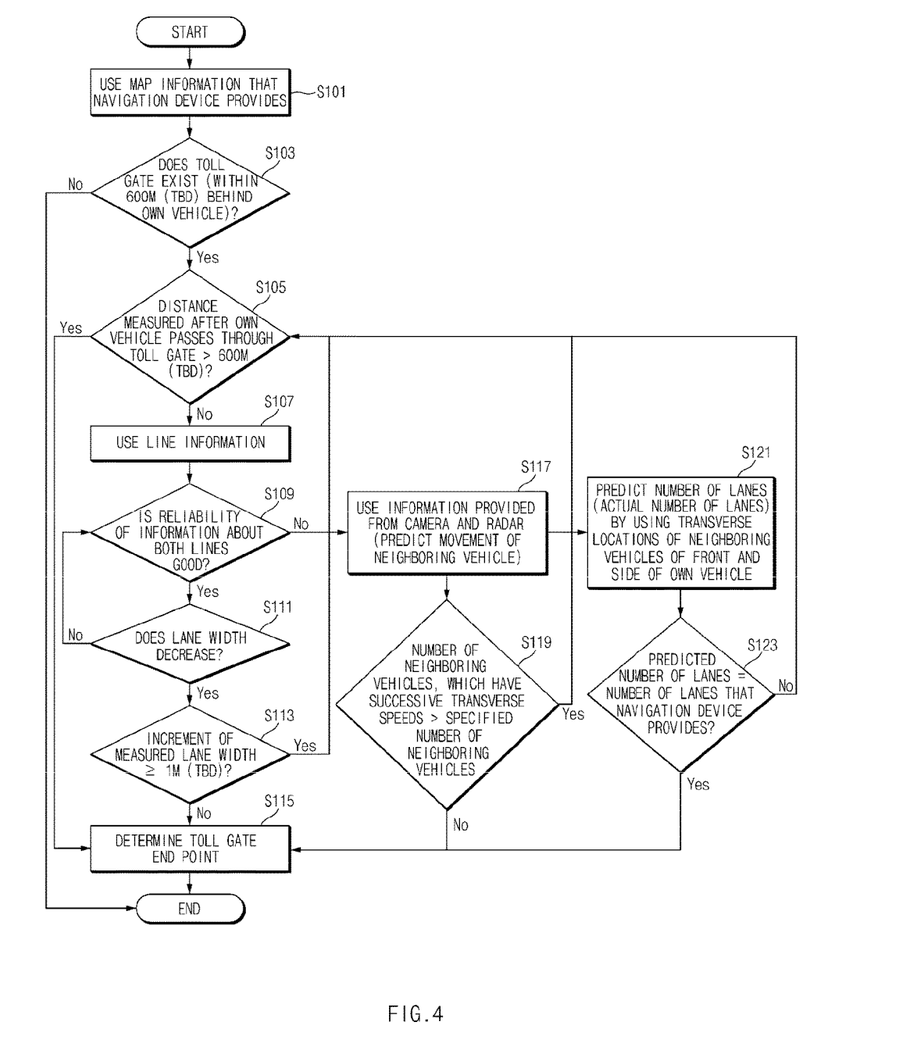
FIG. 4 is a flowchart for describing a method for determining an end point of a toll gate section, according to an exemplary embodiment of the present invention.

FIG. 4 is a flowchart for describing a method for determining an end point of a toll gate section, according to an exemplary embodiment of the present invention.

Referring to FIG. 4, a method for determining the end point of the toll gate section by a toll gate section determining device of an apparatus that determines the toll gate section will be described in detail.

In operation S101, the device that determines the toll gate section uses map information that the navigation device provides. That is, the map information that the navigation device provided includes toll gate point information, the number of lines in a driving direction, the speed limit of a road, and the road configuration (a general road or a highway).

In operation S103, the device that determines the toll gate section determines whether a toll gate is behind the own vehicle by use of the map information provided by the navigation device.

In operation S105, the device that determines the toll gate section compares the distance measured after the own vehicle passes through a toll gate with a distance TDB.

For example, the distance TBD may be set to 600 m, and the distance TBD may be reset by the user or the device that determines the toll gate section.

In operation S107, when the distance measured after the own vehicle passes through a toll gate is less than a distance TBD the device that determines the toll gate section uses line information.

That is, the device that determines the toll gate section determines the toll gate section by use of the line information which the camera and radar provide, and location information of a vehicle that the navigation device provides.

In operation S109, the device that determines the toll gate section determines the reliability of the information about both lines.

Herein, a method in which the device that determines the toll gate section determines the reliability of the information about both lines may also determine the reliability of a left right line with respect to the lane in which the vehicle is driving, by determining how much a line is recognized in the line information (a degree of recognition of the line).

In operation S111, when the reliability of the information about both lines is valid, the device that determines the toll gate section determines whether the lane width decreases.

In operations S113 and S115, when the lane width decreases the device that determines the toll gate section compares the increment of the measured lane width with the increment of a specified lane width.

For example, the increment of the specified lane width may be set to 1 m, and the increment of the measured lane width may be reset by the user or the device that determines the toll gate section.

In other words, when the increment of the measured lane width is smaller than the increment of a specified lane width, the device that determines the toll gate section determines a current point as the toll gate end point.

However, in operation S109, when the result of determining the reliability of the information about both lines indicates that the reliability is not valid, in operation S117, the device that determines the toll gate section predicts the movement of the neighboring vehicle by use of the camera and radar.

That is, the device that determines the toll gate section may determine the toll gate section by use of the movement information of the neighboring vehicle which the camera and radar provide, and vehicle information that the navigation device provides.

In operation S119, the device that determines the toll gate section compares the number of neighboring vehicles which have successive transverse speeds with the specified number of neighboring vehicles.

In other words, when the number of neighboring vehicles which have successive transverse speeds is greater than the specified number of neighboring vehicles, the device that determines the toll gate section determines the current point as the toll gate end point.

Furthermore, in operation 121, the device that determines the toll gate section predicts the number of lanes (the actual number of lanes) by use of the transverse locations of neighboring vehicles to the front and side of the own vehicle.

In operation S123, the device that determines the toll gate section compares the predicted number of lanes with the number of lanes that the navigation device provides.

In other words, when the predicted number of lanes is the same as the number of lanes that the navigation provides, the device that determines the toll gate section determines the current point as the toll gate end point.

Figure 5:
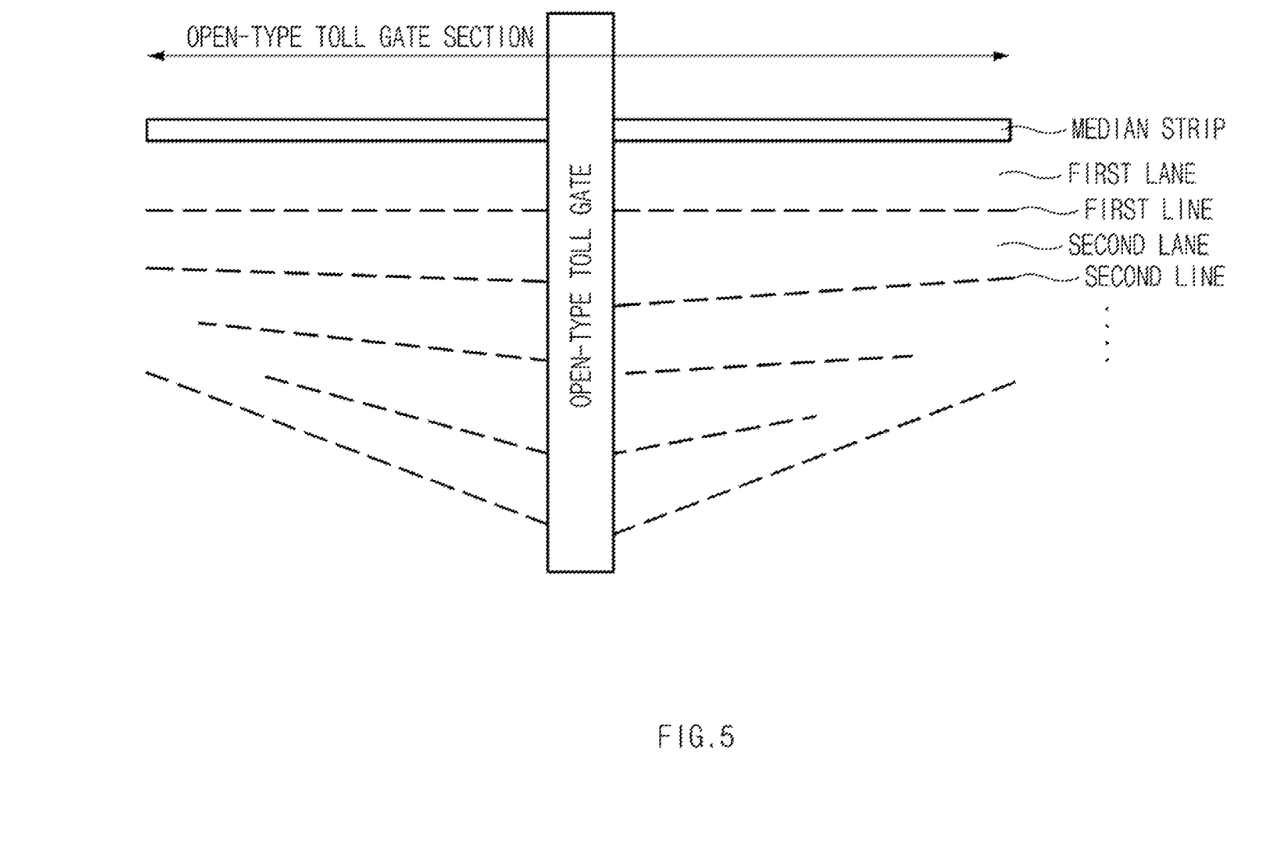
FIG. 5 is a drawing for describing a method for determining a toll gate section based on map information received from a navigation device included in a vehicle, according to an exemplary embodiment of the present invention.

FIG. 5 is a drawing for describing a method for determining a toll gate section based on map information received from a navigation device included in a vehicle, according to an exemplary embodiment of the present invention.

Referring to FIG. 5, a device that determines the toll gate section determines a toll gate location based on the map information received from the navigation device while an own vehicle is driving.

Afterwards, when a lane width between the own vehicle which is driving and a toll gate increases (the number of lines increases), the device that determines the toll gate section may determine the current point as the starting point of the toll gate section.

In addition, after the own vehicle passes through the toll gate, when a lane width between the own vehicle and a toll gate decreases (the number of lines decreases) the device that determines the toll gate section may determine the current point as the end point of the toll gate section.

Figure 6:
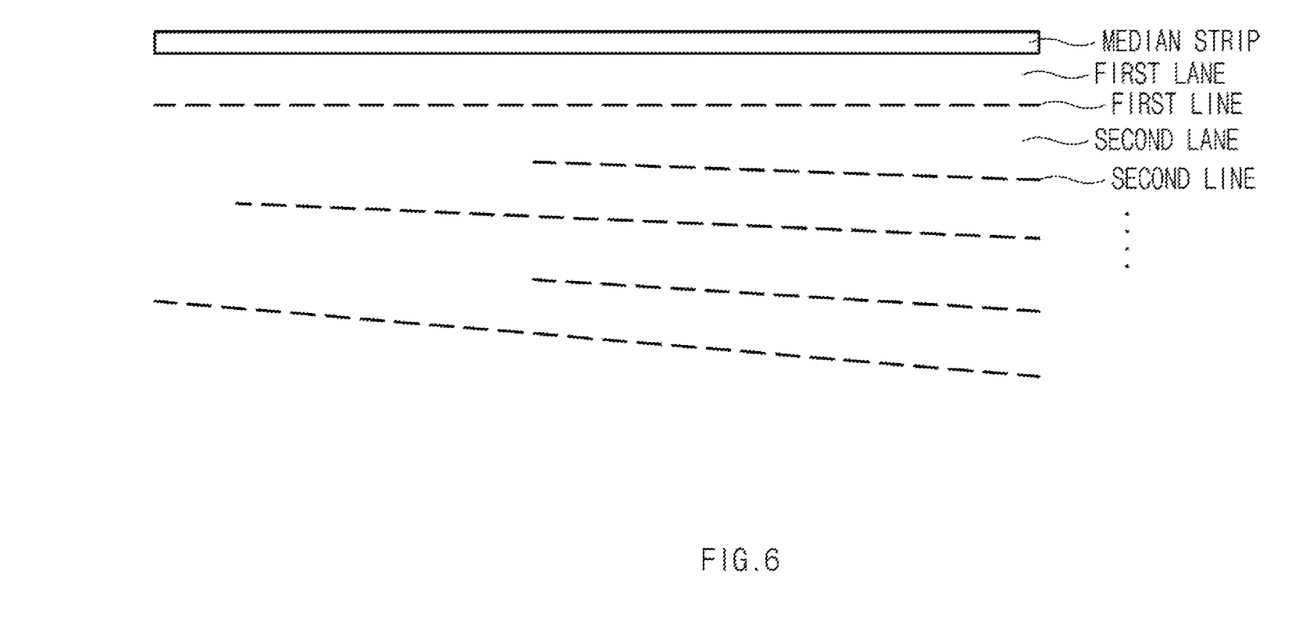
FIG. 6 and FIG. 7 are drawings for describing a pattern of a line in a toll gate section, according to an exemplary embodiment of the present invention.
Figure 7:
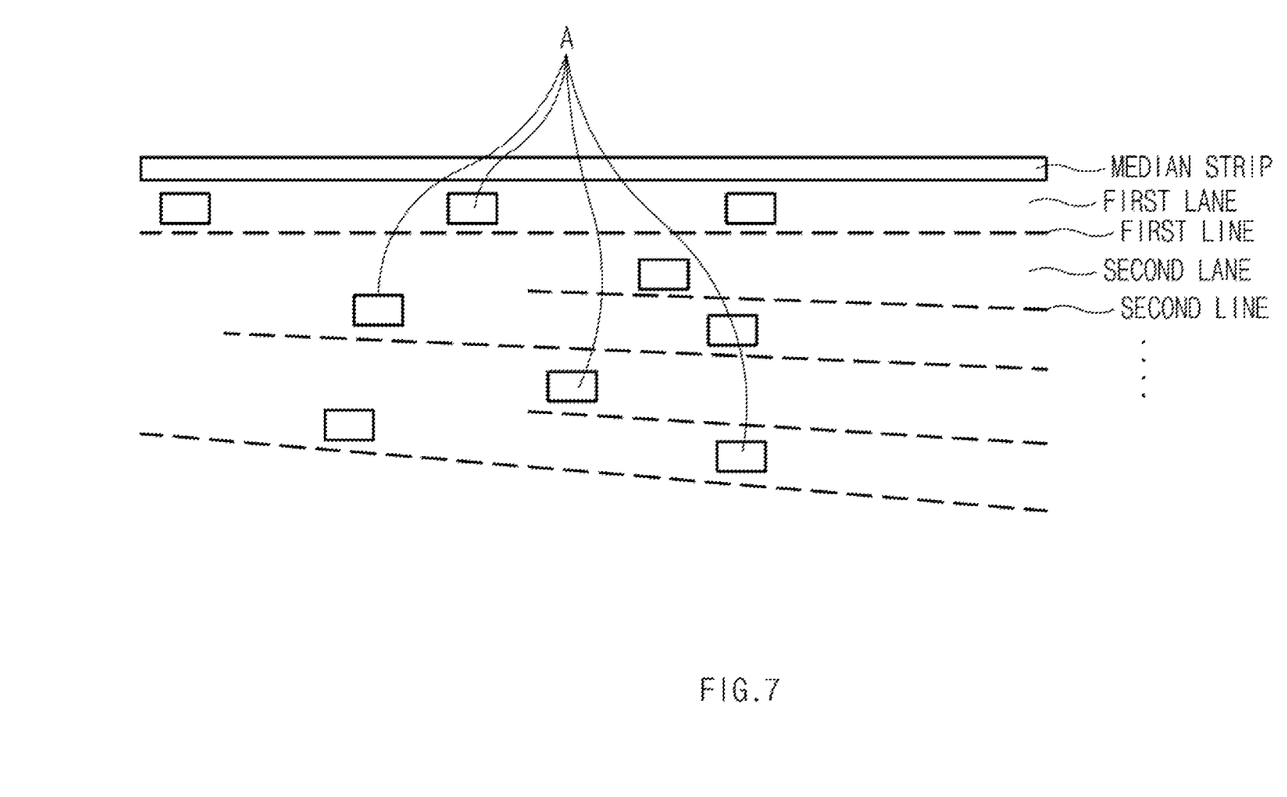

FIG. 6 and FIG. 7 are drawings for describing a pattern of a line of a lane width in a toll gate section, according to an exemplary embodiment of the present invention.

Referring to FIG. 6 and FIG. 7, a device that determines the toll gate section may determine the toll gate section based on line information received from a camera or radar, and may determine the toll gate section by use of a phenomenon in which transverse locations of neighboring vehicles are changed.

For example, FIG. 6 illustrates a pattern in which the lane width increases (the number of lines increases) at the starting point of the toll gate section, a new line is generated, and the lane width decreases (the number of lines decreases) from a specific time point after the vehicle passes through a toll gate.

Furthermore, in FIG. 7, when a lane width increases (the number of lines increases), neighboring vehicles 'A' from the starting point of the toll gate section to the toll gate may dispersedly drive in the increased lane width. When the lane width decreases (the number of lines decreases) after the neighboring vehicles 'A' pass through the toll gate, the neighboring vehicles 'A' may drive together on the decreased lane width.

Figure 8:
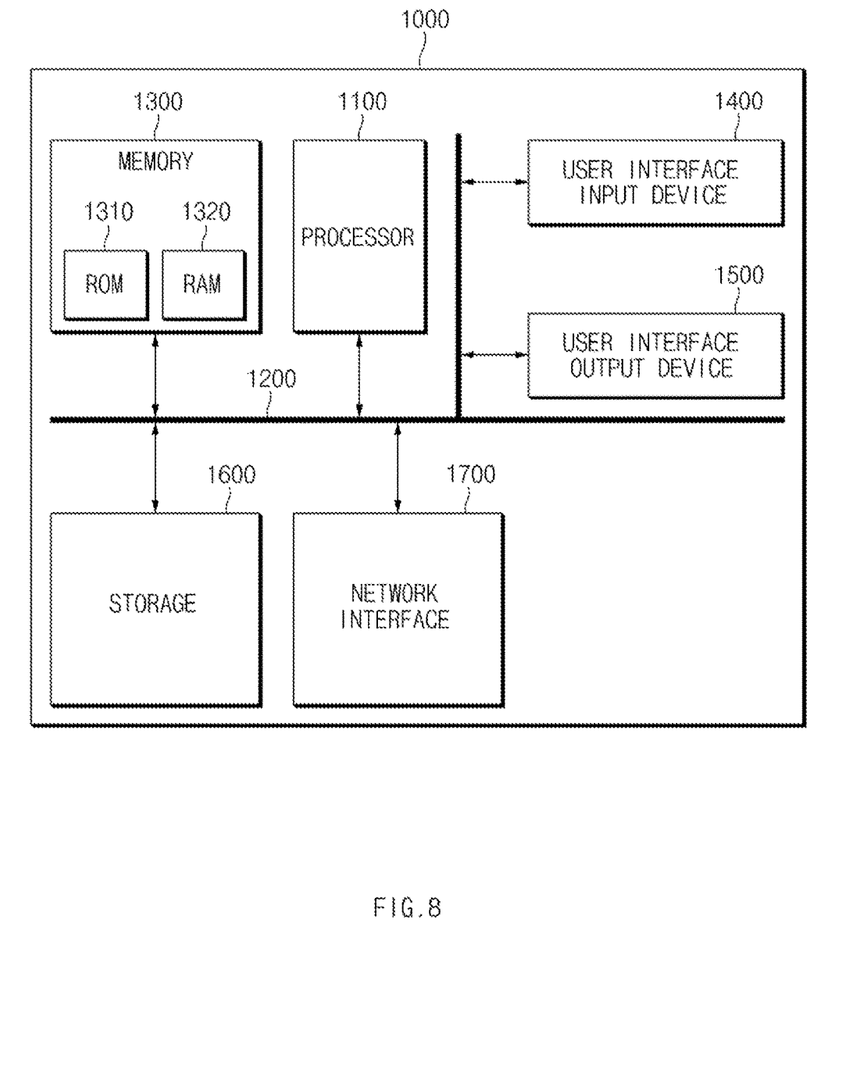
FIG. 8 is a block diagram illustrating a computing system that performs a method for determining a toll gate section, according to an exemplary embodiment of the present invention.

FIG. 8 is a block diagram illustrating a computing system that performs a method for determining a toll gate section, according to an exemplary embodiment of the present invention.

Referring to FIG. 8, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing device CPU or a semiconductor device that processes instructions stored in the memory 1300 and/or the storage 1600. Each of the memory 1300 and the storage 1600 may include various types of volatile or non-volatile storage media. For example, the memory 1300 may include a read only memory ROM and a random access memory RAM.

Thus, the operations of the methods or algorithms described in connection with the exemplary embodiments in the specification may be directly implemented with a hardware module, a software module, or combinations thereof, executed by the processor 1100. The software module may reside on a storage medium (e.g., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM CD-ROM. The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit ASIC. The ASIC may reside in a user terminal. Alternatively, the processor and storage medium may reside as a separate component of the user terminal.

The present invention may recognize an actual driving environment by use of a camera, radar, and a navigation device and may determine a toll gate section based on the recognized driving environment.

In addition, the present invention may reduce risk by determining a section in which uncertainty about a line and the movement of the neighboring vehicle increases including a toll gate section while the vehicle is driving on a highway and restricting the lane change of a vehicle.

Furthermore, the present invention may determine the starting and end points of a toll gate section in an environment, which is the same as an environment of an actual road, by use of the map information of the vehicle which is obtained from the navigation device, in addition to movement information of the neighboring vehicles and information about a line obtained from the camera and radar, reducing the sense of difference that a driver feels when driving the vehicle.

Meanwhile, the above-mentioned method of the present invention may be implemented as a computer program. Codes and code segments constituting the computer program may be readily inferred by a computer programmer in the field. In addition, the computer program may be stored in computer-readable recording media (information storage media) and may be read and executed by a computer, implementing the method of the present invention. In addition, the recording media includes all types of recording media that are computer-readable.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A toll gate section determining apparatus comprising:
an information providing device configured to provide information by use of a camera, a radar, and a navigation device;
a toll gate section determining device configured to determine a toll gate section based on movement information of a neighboring vehicle and line information, which are provided from the camera and the radar, and map information provided from the navigation device; and
a vehicle control device configured to control longitudinal driving or transverse driving of a vehicle when a current section is determined as the toll gate section,
wherein the toll gate section determining device determines the toll gate section by analyzing whether the neighboring vehicle shows an unstable transverse driving pattern.

2. The toll gate section determining apparatus of claim 1, wherein the information providing device includes:
a map information processing device configured to determine a road environment of a driving direction of an own vehicle based on the map information;
a neighboring vehicle movement determining device configured to determine movement of a detected neighboring vehicle; and
a line information processing device configured to process the line information of the vehicle, which is driving, by use of the camera and the radar.

3. The toll gate section determining apparatus of claim 2, wherein the map information processing device determines toll gate point information, a number of lines of the driving direction, a speed limit of a road, and a general road or a highway.

4. The toil gate section determining apparatus of claim 2, wherein the neighboring vehicle movement determining device determines longitudinal speed and transverse speed, acceleration, relative speed, relative acceleration, a relative location of the neighboring vehicle.

5. The toll gate section determining apparatus of claim 2, wherein the line information processing device processes the line information of the vehicle, which is currently driving, or location information of a road facility.

6. The toil gate section determining apparatus of claim 1, wherein the map information includes toll gate point information, a point in which a number of lines of a driving direction increases or decreases, and a speed limit of a road.

7. The toll gate section determining apparatus of claim 1, wherein the toll gate section determining device determines the toll gate section based on whether a lane width increases or decreases.

8. The toll gate section determining apparatus of claim 1, wherein when the toll gate section determining device determines the current section as the toll gate section, the vehicle control device decelerates the vehicle below safety speed, selectively controls only a lane keeping function, or provides notification whether the vehicle enters the toll gate section by displaying a cluster or providing an alarm sound.

9. A method for determining a toll gate section, the method comprising:
determining whether a toll gate is in front of an own vehicle, by use of map information that a navigation device included in a vehicle provides;
comparing a remaining distance from a location of the own vehicle to the toll gate with a distance to be determined (TBD) by use of the map information;
determining reliability of information about both lines of a lane in which the vehicle is driving;
when the reliability of the information about the both lines is achieved, determining whether a lane width increases;
when the lane width increases, comparing a measured lane width with a specified lane width;
when the result of comparing the measured lane width with the specified lane width indicates that the measured lane width is greater than the specified lane width, comparing a decrement of the measured lane width with a decrement of the specified lane width;
when the decrement of the measured lane width is greater than the decrement of the specified lane width, determining a current point as a toll gate starting point; and
when the reliability of information is not achieved, determining the toll gate section by analyzing whether a neighboring vehicle shows an unstable transverse driving pattern.

10. The method of claim 9, wherein the determining of the reliability of the information about the both lines of the lane includes:
when the result of determining the reliability of the information about the both lines indicates that the reliability of the information about the both lines is not achieved, predicting movement of the neighboring vehicle by use of a camera and a radar.

11. The method of claim 10, wherein the predicting of the movement of the neighboring vehicle includes:
comparing a number of neighboring vehicles, which have successive transverse speeds, with a specified number of neighboring vehicles;
predicting a number of lanes by use of transverse locations of the neighboring vehicles of a front and a side of the own vehicle; and
comparing the predicted number of lanes with the number of lanes that the navigation device provides.

12. The method of claim 11, further comprising:
when the predicted number of lanes is greater than the number of lanes that the navigation device provides, determining a current point as the toll gate starting point.

13. A method for determining a toll gate section, the method comprising:
determining whether a toll gate is behind an own vehicle, by use of map information that a navigation device included in a vehicle provides;
comparing a distance measured after the own vehicle passes through a toll gate with a distance to be determined by use of the map information;
determining reliability of information about both lines of a lane in which the vehicle is driving;
when the reliability of the information about the both lines is achieved, determining whether a lane width decreases;
when the lane width decreases, comparing an increment of a measured lane width with an increment of a specified lane width;

when the increment of the measured lane width is smaller than the increment of the specified lane width, determining a current point as a toll gate end point; and when the reliability of information is not achieved, determining the toll gate section by analyzing whether a neighboring vehicle shows an unstable transverse driving pattern.

14. The method of claim 13, wherein the determining of the reliability of the information about the both lines of the lane includes:

when the result of determining the reliability of the information about the both lines indicates that the reliability of the information about the both lines is not achieved, predicting movement of the neighboring vehicle by use of a camera and a radar.

15. The method of claim 14, wherein the predicting of the movement of the neighboring vehicle includes:

comparing a number of neighboring vehicles, which have successive transverse speeds, with a specified number of neighboring vehicles;

predicting a number of lanes by use of transverse locations of the neighboring vehicles of a front and a side of the own vehicle; and comparing the predicted number of lanes with the number of lanes that the navigation device provides.

16. The method of claim 15, further comprising:

when the predicted number of lanes is a same as the number of lanes that the navigation device provides, determining the current point as the toil gate end point.

\* \* \* \* \*